United States Patent Office 3,110,564
Patented Nov. 12, 1963

3,110,564
PROCESS FOR THE MANUFACTURE OF ACTIVE SILICIC ACID FROM A HIGH PERCENT SILICATE SLAG
Franz Rodis, Knapsack, near Cologne, and Joseph Cremer, Hermulheim, near Cologne, Germany, assignors to Knapsack-Griesheim Aktiengesellschaft, Knapsack, near Cologne, Germany, a corporation of Germany
No Drawing. Filed July 3, 1959, Ser. No. 824,781
Claims priority, application Germany July 9, 1958
3 Claims. (Cl. 23—182)

The present invention relates to a process for the manufacture of active silicic acid from a high percent silicate slag, especially from phosphorus slag as obtained in the thermic manufacture of phosphorus.

It is known to obtain active silicic acid from siliceous materials, for example kaolin, clay, raw bleaching earth, phonolite, permutite, or also slags, for example generator slag or phosphorus slag. For this purpose, the raw material is, in general, first ground finely and the pulverulent, water-insoluble silicates obtained are subjected to a prolonged treatment by means of concentrated acids. As a rule, the operation is carried out with an acid surplus. In the course of this process, there is first formed a silicic acid gelatin which is converted into active silicic acid by washing, shaping and drying.

The processing of the reaction products obtained by these processes is connected with difficulties; for example, washing the gelatin with water is a lengthy procedure and drying necessitates particularly large-area drying installations.

These disadvantages can be overcome by decomposing the phosphorus slag topochemically with acid, i.e. in such a manner that the silicic acid obtained after the reaction exhibits the shape and structure of the initial slag. Products obtained in this manner can be used with advantage, for example, as carriers for contact masses, as catalysts, fillers etc. It was found, however, that the adsorptive capacity is not sufficient to render possible their industrial use as artificial bleaching earths.

The relatively low adsorptive capacity is espeically disadvantageous since the products obtained by topochemical decomposition lend themselves with special advantage for the use as artificial bleaching earths on account of their good filtering property, which is due to their structure. When refining petrochemical products, there can be obtained, for example, a correspondingly increased productive capacity of the installation solely by shorter periods of filtration without employing additional technical measures. The special advantages of the products obtained by topochemical decomposition could, however, not fully be exploited because the bleaching effect was insufficient.

Now we have found that there can be produced active silicic acid which is not only obtained in granular form thus having particularly good filtering properties, but which exhibits, moreover, a bleaching effect which is at least equivalent to that of the natural, highly activated bleaching earths, by using a specific starting material and bringing about the topochemical decomposition under certain, strictly limited conditions.

After having gained increased experience in the production of elementary phosphorus by the electrothermic method, it became possible to obtain a slag of which more than 90% consists of pure calcium metasilicate. Depending on the method of processing, the slag is either available in a foamy-glassy form (granular product) or in a foamy-crystalline form (foamed slag). In both cases the determination of the apparent density ($\sim$1.3 g./ml.) as compared with compact slags (2.6 g./ml.) shows that the density is by about half the amount lower, which corresponds to a volume of pores of about 50%. In the course of the topochemical decomposition of this high percent silicate slag by means of acid according to the process of the invention, granular silicic acid having a strong bleaching effect is obtained by introducing the slag, without prior trituration, into the stoichiometric amount or a surplus of up to 10% (calculated on the amount of calcium contained in the slag) of diluted acid of at most 30% strength, provided that the slag is added during a period not exceeding 30 minutes while maintaining a temperature limit of 60° C.

The period of introducing the slag into the acid is of particular importance. A period of 30 minutes should not be exceeded since, otherwise, there is obtained a product with highly reduced adsorptive capacities. Particularly advantageous results are obtained when respective amounts of slag and acid are simultaneously brought into contact. Since it was found, however, that the temperature prevailing in the course of the decomposition must be as low as possible, preferably within the range of 30° to 45° C., such an instantaneous combination can only be realized with difficulty from a technical point of view on account of the exothermic course of the reaction and the cooling provoked thereby. It was found, moreover, that as an additional measure the concentration of the acid placed in the reaction vessel must be kept within narrow limits when a highly active artificial bleaching earth is to be produced. The optimum concentration is about 20%.

One of the advantages realized according to the process of the invention is that acids of low concentration can be used for the topochemical decomposition; these acids are frequently available in the form of cheap waste acids.

When working with acids of higher concentration and at higher temperatures, for example with hydrochloric acid of 30% strength and at a temperature of 65° C., there are also obtained products with permanent properties showing, however, a deterioration in quality as compared with top grade products of natural, highly activated bleaching earths. The reason therefor has not yet clearly been found out in detail and shall be clarified by systematic examinations of the texture. At present the conception is prevalent that the type and formation of the pores depend on the acid concentration and the temperature employed in the course of the topochemical decomposition.

It is especially expedient to use aqueous hydrochloric acid as the acid. In the course of the decomposition reaction, readily soluble chlorides are formed that can, with relatively little water, be washed out rapidly from the reaction product.

The granular slag may have a particle size of up to 3 mm. which, as a rule, is the range in which the slag is obtained in the thermic manufacture of phosphorus.

In the case of larger batches, it has proved to be advantageous to divide the slag into different granular fractions by screening and to introduce these fractions successively into the acid beginning with the larger fraction.

The optimum temperature lies at about 45° C. It is not necessary to provide external heating since the amount of heat liberated during the reaction is sufficient to maintain the reaction mixture at the desired temperature. It is, on the contrary, necessary to cool the mixture in the course of the reaction by appropriate measures in order to prevent the temperature from exceeding 60° C.

The decomposition of the acid having been terminated, the reaction product in view of its granular structure, deposits sediment rapidly on the bottom of the reaction vessel so that the main amount of liquid can be removed merely by decanting while the sediment can easily and rapidly be filtered off and washed out. When no more cations and/or anions can be detected in the wash water, the sediment is dried at about 200° C. to 300° C. The silicic acid obtained in granular form has very good bleaching properties as is shown in the following table.

In order to carry out a comparison between the artificial bleaching earths obtained by the process of the invention and the prior art products, the results of the same bleaching tests carried out with different products are enumerated in the table given below wherein (column 1)

Product A is a natural, highly activated bleaching earth (commercial product "Tonsil AC")
Products B (1–6) are obtained by the process of the present invention (Examples 1–6)
Product C is obtained by topochemical decomposition, but under conditions deviating from those prevailing when applying the process of our invention (Example 7).

It follows from the table that the periods of filtration (column 2) of the bleaching earths obtained by topochemical decomposition by means of acid are about half as short as the filtration periods of the commercial product, while the bleaching effect (column 3) of the products produced by the process of the invention equals, under the most favorable conditions, the bleaching effect of the commercial product and is, on the average, by about 60% higher than that of the silicic acid obtained according to Example 7.

Column 4 indicates the acid content of the different products which, in practical application, is also of great importance for the evaluation of bleaching earths that have been chemically formed, and which shall be as low as possible. The values obtained with the products of our invention are lower than those of the commercial products, which is advantageous in commercial manufacture.

| Bleaching earth | Filtration period (sec.) | Permeability to light, percent | Percent of acid (calculated on $H_2SO_4$) |
| --- | --- | --- | --- |
| Product A | 100 | 95 | 0.038 |
| Product B: | | | |
| 1 | 50–60 | 94 | 0.020 |
| 2 | 50–60 | 93 | 0.021 |
| 3 | 50–60 | 78 | 0.024 |
| 4 | 50–60 | 80 | 0.023 |
| 5 | 50–60 | 76 | 0.029 |
| 6 | 50–60 | 96 | 0.020 |
| Product C: | | | |
| 7 | 60–70 | 51 | 0.049 |

Thus the products obtained by the process of the invention can be used with special advantage as bleaching earths in the refining of petrochemical products and are highly suitable as carriers for catalysts and as fillers.

The following examples serve to illustrate the invention, but they are not intended to limit it thereto:

Example 1

370 liters of aqueous hydrochloric acid of 20% strength are placed in a reaction vessel made of sheet steel (capacity: 500 liters), the interior of which can be lined with acid-resistant material, for example rubber, and which has an inside diameter of 780 mm. and a height of 1000 mm. 125 kilos of phosphorus slag in foamy-crystalline form (particle size 0–3 mm.) are charged into the acid via a magnetic channel within 15 minutes while the reaction mixture is stirred by means of an agitator driven by a compressed-air engine at a rate of 300 rotations/minute. In the reaction vessel there is installed a double cooling coil made of an acid-resistant metal tube, said coil having an effective cooling area of 5.5 m.² Cooling brine which is kept at a temperature of +5° C. passes through these metal tubes. The rotational speed of the brine is such that the reaction temperature does not exceed 40° C.

The amount of hydrochloric acid placed in the reaction vessel corresponds to 105% of the equivalent amount of calcium oxide present in the slag. This amount of calcium oxide is previously determined by an anlysis of the slag.

After the slag has been charged into the acid, agitation is continued for 20 minutes at room temperature or at temperatures not exceeding 40° C. Then the reaction mixture is given on to a suction filter made of acid-resistant sheet steel. The suction filter consists of a vessel having a capacity of 200 liters and an inside diameter of 800 mm., at half-height of which vessel a grate is installed. On the grate is a sieve-netting having a filter area of 0.5 m.² and a mesh aperture of 0.2 mm.

By means of a vacuum which is maintained constant by a steam jet air ejector, the liquid is drawn off from the solid product. The residue is washed with water for a short time, then placed in a washing vessel (capacity 250 liters) and stirred for 15 minutes with about 200 liters of water. After the stirrer has been disconnected, the reaction product deposits in particles of almost the same grain size in which the starting material was placed in the reaction vessel. The supernatant water is then sucked off. This washing process is repeated 5 to 6 times; then the washing residue is suction-filtered and dried at about 250° C. A granular, highly active silicic acid is obtained.

Example 2

50 kilos of phosphorus slag in foamy-crystalline form (0–3 mm.) having a content of 92.5% of calcium metasilicate are introduced in portions via a magnetic channel, with agitation and within a period of 20 minutes, into the reaction vessel with 189 liters of hydrochloric acid $D_{20}$ 1.075 of 15% strength (5% acid surplus).

During this period, the temperature in the reaction mixture is kept at 40° C. by cooling. The introduction of the slag having been terminated, the mixture is allowed to stand for about 30 minutes during which time the gel deposits in almost the same granular form in which the starting material was placed in the reaction vessel. The supernatant solution is decanted, the sediment, as described in Example 1, rinsed several times with water, filtered off on a simple suction-filter and washed with water until the test as to calcium ions and chlorine ions is negative. Then the granular sediment is dried at about 300° C.

There are obtained 20.8 kilos of active silicic acid, which represents 87% of the theoretical yield.

Example 3

50 kilos of phosphorus slag in a foamy-glassy form having a content of 91.2% of calcium metasilicate is used as starting material. The process is carried out as indicated in Example 1, however, as an acid there is used 87 liters of a hydrochloric acid $D_{20}$ 1.15 of 30% strength (5% acid surplus).

The temperature rise to 45° C. takes place within the first 3 minutes. The cooling is regulated such that a temperature of 60° C. is not exceeded.

After having been introduced, the mixture is allowed to stand for about 30 minutes. The gel, which is again obtained in the form of a granular deposit, is worked up as described in Example 1. 21.3 kilos of a granular, active silicic acid (representing 90% of the theoretical yield) are obtained, said silicic acid having a bulk density of 0.36.

Example 4

50 kilos of a foamy-glassy phosphorus slag having a content of 90.5% of calcium mestasilicate and having the following particle sizes:

| | Mm. |
| --- | --- |
| 3.6% | 3.0–2.0 |
| 37.0% | 2.0–1.0 |
| 59.4% | 1.0–0.5 | are introduced within 15 minutes via a magnetic channel, with agitation, into 185 liters of a hydrochloric acid of 15% strength. During this period, the temperature in the reaction mixture rises to 45° C. within 4 minutes. The temperature is maintained at 45° C., by cooling and the operation is continued as described in Example 1. 21.4 kilos of an active silicic acid are obtained (representing 92% of the theoretical yield) which has a bulk density of 0.40.

Example 5

50 kilos of a phosphorus slag (having the same composition as described in Example 4) are decomposed into the individual sieve fractions:

| | Mm. |
|---|---|
| 5.4 kilos | 3.0–1.5 |
| 44.6 kilos | 1.5–0.5 |

Then 176 liters of a hydrochloric acid of 15% are placed in the reaction vessel into which first the coarse grain is charged, as described in Example 1. Then the sieve fraction having a lower particle size is added. The temperature in the reaction mixture rises almost instantly to about 60° C. and is maintained by cooling at about 45° C. in the course of the further addition of material (about 20 minutes).

After the last fraction has been added and agitation been terminated, the granular gel deposits and can be worked up as described in Example 1.

The yield amounts to 21.2% of active silicic acid having the following composition:

| | Mm. |
|---|---|
| 32.8% | 2.0–1.0 |
| 61.8% | 1.0–0.5 |
| 5.4% | 0.5 | which represents 90% of the theoretical yield.

Example 6

The process is carried out as indicated in Example 5, however, the slag is charged into 84 liters of hydrochloric acid having a strength of 30%. The yield amounts to 21.5 kilos of active silicic acid having a particle size of

| | Mm. |
|---|---|
| 29.4% | 2.0–1.0 |
| 62.4% | 1.0–0.5 |
| 8.2% | 0.5 |

Example 7

750 kilos of a foamed slag are placed in the reaction vessel and 1240 ml. of nitric acid of 45% strength (sulphur=1.275) are added rapidly.

The reaction temperature is maintained at 85° C., and the batch is stirred from time to time until the solution has a density of 1.5 after about one hour. The solution contains practically no more acid; the decomposition is terminated. The further treatment takes place as described in Example 1. 310 grams of a granular silicic acid are obtained.

We claim:

1. In the preparation of active silicic acid suitable for use as bleaching earth by topochemical conversion of phosphorus furnace-slag with hydrochloric acid which slag consists substantially of calcium metasilicate, the improvement which comprises, mixing the slag having a particle size of at most 3 mm. by stirring it with hydrochloric acid of 15 to 30% strength by weight, the acid being used in at least the stoichiometric amount up to an excess of at most 10% by weight, calculated upon the calcium content of the slag, the acid being always present during the mixing in at least the stoichiometric amount, performing the mixing operation at a speed such that the temperature of the mixture can be maintained at 60° C. by cooling, reacting the slag with the acid for about 20 to 30 minutes, depositing the reaction product so obtained, separating the reaction product from the liquid, and washing and drying said product.

2. The process of claim 1 wherein the slag and the acid are introduced simultaneously into a reaction vessel.

3. Process of claim 1 wherein the slag used is divided into different granular fractions between about 0.5 mm. and about 3 mm. which are introduced into the acid beginning with the coarsest fraction.

References Cited in the file of this patent

UNITED STATES PATENTS

| 1,878,108 | Carstens | Sept. 20, 1932 |
|---|---|---|
| 2,686,731 | Wainer | Aug. 17, 1954 |
| 2,774,651 | Loftman | Dec. 18, 1956 |
| 2,805,955 | Allen | Sept. 10, 1957 |
| 2,805,956 | Pechukas | Sept. 10, 1957 |

FOREIGN PATENTS

| 585,938 | Germany | Oct. 18, 1933 |